United States Patent [19]

Heitzmann et al.

[11] Patent Number: 4,642,137
[45] Date of Patent: Feb. 10, 1987

[54] MINERAL BINDER AND COMPOSITIONS EMPLOYING THE SAME

[75] Inventors: Richard F. Heitzmann, Pearland; Mark Fitzgerald, Houston; James L. Sawyer, Friendswood, all of Tex.

[73] Assignee: Lone Star Industries, Inc., Greenwich, Conn.

[21] Appl. No.: 708,689

[22] Filed: Mar. 6, 1985

[51] Int. Cl.$^4$ .............................................. C04B 7/00
[52] U.S. Cl. ....................................... 106/85; 106/76; 106/84; 106/89; 106/315
[58] Field of Search ................. 106/76, 85, 89, 315, 106/84

[56] References Cited

U.S. PATENT DOCUMENTS

| | | | |
|---|---|---|---|
| 4,160,674 | 7/1979 | Sawyer | 106/89 |
| 4,349,386 | 9/1982 | Davidovits | 106/85 |
| 4,472,199 | 9/1984 | Davidovits | 106/85 |
| 4,509,985 | 4/1985 | Davidovits et al. | 106/85 |

*Primary Examiner*—William R. Dixon, Jr.
*Assistant Examiner*—Steven Capella
*Attorney, Agent, or Firm*—McAulay, Fields, Fisher, Goldstein & Nissen

[57] ABSTRACT

A binder composition for Portland cement is disclosed, said composition including 100 parts by weight metakaolin and, based upon said metakaolin, from 20 to 70 parts by weight slag; from 85 to 130 parts by weight of at least 1 material selected from the class consisting of fly ash, calcined shale, and calcined clay; from 70 to 215 parts by weight finely divided silica, preferably amorphous silica; and from 55 to 145 parts by weight of a mixture of potassium silicate and potassium hydroxide, wherein at least 55 parts by weight is potassium silicate. The binder composition can be mixed with Portland cement or with a combination of Portland cement and fly ash to provide a composition curable to a material having a high early strength and a high ultimate strength.

12 Claims, No Drawings

MINERAL BINDER AND COMPOSITIONS EMPLOYING THE SAME

BACKGROUND OF THE INVENTION

Portland cement has long been a standard building material. Over the years, various modifiers have been developed for Portland cement formulations to provide particular properties or advantages, such as more rapid curing, compatibility with and resistance to certain materials, varying strengths, etc. Frequently, the modified formulations have worked at cross purposes, so that a Portland cement formulation which initially cures more rapidly results in a final product with a lower strength, while the higher strength Portland cement formulations frequently cannot be demolded for substantial periods of time because there is not sufficient early strength.

In the past few years, geopolymers have been found which, though mineral in composition, provide many of the properties of molding resins, such as epoxies and polyurethanes. Such geopolymers are described and claimed, for example, in U.S. Pat. Nos. 4,349,386 and 4,472,199, each in the name of Joseph Davidovits. These geopolymers are primarily composed of silicas and aluminas, mixed and reacted in particular ways to provide the desired structure. While, in general, these geopolymers are perfectly adequate for the purposes intended, as such, they do not provide the types of strengths sought in a Portland cement composition.

The art has continued to seek a Portland cement composition which provides for utilization in standard situations, while providing both a high early strength and an ultimate, very high strength. In particular, compositions having a minimum strength of 4,000 psi at 4 hours, the release strength necessary for prestress work, have been sought.

BRIEF DESCRIPTION OF THE INVENTION

In accordance with the present invention, a mineral binder, which can be used in conjunction with Portland cements, has been developed. It has been found that the geopolymers just referred to cannot be used, directly, with Portland cement to form a usable, workable composition. While curing does take place, there is a danger of rapid loss of plasticity, such that there is no workability, a necessary property if the cement composition is to be practically employed.

It has unexpectedly been discovered that by modifying the composition of the geopolymers, particularly by replacement of substantial amounts of the alkali metal silicates with finely divided silica, particularly amorphous silica, a cement composition is produced which has the high early strengths desired and will continue to cure to develop extremely high ultimate strengths, as much as 13 to 15,000 psi in compression when cured at room temperature. It is possible to replace all of the alkali metal silicate with finely divided silica, and certain advantages, such as simplified shipping and handling are achieved, as more fully set forth in our copending application Ser. No. 708,732, filed on even date herewith.

In accordance with the present invention, a binder composition has been developed for use with Portland cement compositions to form materials having high early strength and high ultimate strength. The formulation for these binders, in parts by weight, is as follows:

100 parts metakaolin
20 to 70 parts slag
85 to 130 parts of at least one material selected from the class consisting of fly ash, calcined shale, and calcined clay
70 to 215 parts finely divided silica, preferably amorphous silica
55 to 145 parts of a mixture of potassium silicate and potassium hydroxide, there being at least 55 parts by weight potassium silicate.

The binder composition described above is blended with Portland cement, or Portland cement modified in ways presently known to the art to provide the high early strength, high ultimate strength compositions. Among the materials which can be included with the Portland cement are fly ash, various admixtures or retarders, etc.

When the mixture of binder and Portland cement is mixed with water and placed into a mold for curing at 150° F. to 195° F. temperature, demolding is generally possible within about one hour. Not only is this more rapid than with Portland cement, alone, but is also generally faster than the time within which the geopolymers previously referred to can be demolded, curing of the geopolymers normally requiring 2 to 4 hours before demolding is possible.

While the binder-Portland cement compositions of the present invention frequently develop strengths of 4,000 psi, the strength needed in prestress work, within the four hours allotted, and such strengths are preferable, a strength of only about 1,000 to 1,500 psi is required for demolding in other situations and the partially cured concrete is generally handleable at such a strength. Because of the components of the present invention, cure continues for a substantial period of time, and ultimate strengths of as much as 13,000 to 15,000 psi are obtainable employing the binders of the present invention in combination with Portland cement.

DESCRIPTION OF THE PREFERRED EMBODIMENTS

The binder composition for use in conjunction with Portland cements, in accordance with the present invention, has the following general formulation, where all parts are by weight:

100 parts metakaolin
20 to 70 parts slag
85 to 130 parts of at least one material selected from the class consisting of fly ash, calcined shale, and calcined clay
70 to 215 parts finely divided silica, preferably amorphous silica
55 to 145 parts of at least one material selected from the class consisting of potassium silicate and potassium hydroxide, where there are at least 55 parts of potassium silicate.

It will be noted that the composition is based upon 100 parts of metakaolin, the other materials being set forth as a weight ratio of the metakaolin. The metakaolin ($Al_2O_3.2SiO_2$) is obtained by dehydroxylating kaolinite by heating at temperatures above 500° C. until the characteristic crystal structure is destroyed. The optimum temperature range is 600° C. to 800° C.

The slag employed in the binder of the present composition can be Lone Star Miami ground sidmar slag which has the following characteristics:

| MIAMI PLANT GROUND SIDMAR SLAG | |
|---|---|
| Glass, % Microscope | 70 |
| $SiO_2$ | 32.83 |
| $Al_2O_3$ | 11.59 |
| $Fe_2O_3$ | 1.58 |
| CaO | 41.43 |
| MgO | 8.03 |
| $TiO_2$ | 0.55 |
| $Na_2O$ | 0.28 |
| $K_2O$ | 0.41 |
| SrO | 0.06 |
| $SO_3$ | 0.42 |
| S | 0.99 |
| Gain on Ignition | 0.86 |
| Corrected Loss | 1.12 |
| Hydraulic Index | |
| I | 1.86 |
| $I_H$ | 1.80 |

The slag employed is a latent hydraulic product which can be activated by suitable activators. Without an activation, the development of the strength of the slag is extremely slow. It is also known that the development of the slag necessitates a pH higher than or equal to 12. The best activators are then Portland cement, clinker, $Ca(OH)_2$, NaOH, KOH, and waterglass. The 7 day compressive strengths of activated slags with different alkali activators are given in the paper presented by J. Metso and E. Kapans, "Activation of Blast Furnace Slag by Some Inorganic Materials," at the "CAMET/ACI First International Conference on the Use of Fly Ash, Silica Fume, Slag and Other Mineral By-products in Concrete," July 31–August, 1983, Montebello, Quebec, Canada. An addition of 4% by weight of NaOH gave a compressive 7 day strength of 12 to 20 MPa (1740 to 2900 psi), and a compressive 28 day strength of 22 MPa (3190 psi).

The slag is employed in amounts of from about 20 to 70 parts, based upon 100 parts of the metakaolin. Preferably, the amount employed is from about 30 to 50 parts.

Another essential component of the binder composition of the present invention is one or more of fly ash, calcined shale, or calcined clay. A mixture of these materials can be used, as well. The amount employed is from 85 to 130 parts, by weight, based upon 100 parts of the metakaolin. These materials are reactive, and, therefore, participate in the curing reaction forming the final product.

A major distinction between the binder of the present invention and the compositions of the prior art is the use of finely divided silica, preferably amorphous silica. The amount of this material, as indicated, is in the range of from 70 to 215 parts, based upon 100 parts of the metakaolin. Preferably, the amount of finely divided silica is from about 85 to 160 parts, most preferably from about 85 to 115 parts, based upon 100 parts of the metakaolin.

As indicated, the preferable finely divided silica is an amorphous silica and, of the amorphous silicas, silica fume is preferred. However, other amorphous or finely divided silicas such as rice hull ash, microcrystalline silica, pozzolane, and others known in the art, can be substituted.

The finely divided or amorphous silica, to the greatest extent, is a substitute for the sodium and potassium silicates of the materials of the prior art. It has been found that the use of these silicates in combination with Portland cement should, to a great extent, be avoided, because of the possibility of rapid loss of plasticity of the material, preventing desired workability. Additionally, the amorphous silicas are less expensive than the silicates and allow for continuing reaction of the materials so that the ultimate strength of the binder, or concrete when used in combination with Portland cement, is higher.

The last component of the binder of the present invention is an alkaline component and is selected from the group consisting of potassium hydroxide and potassium silicate in an amount of from 55 to 145 parts, by weight, based upon 100 parts of the metakaolin. If desired, no potassium hydroxide need be employed, and the entire alkaline constituent can be potassium silicate. The preferable amount of the combination of these two materials is from about 65 to 115 parts, based upon 100 parts of the metakaolin and, if desired, all of this material, as indicated, can be potassium silicate.

If desired, sodium hydroxide can be substituted for potassium hydroxide and sodium silicate for potassium silicate, on a weight basis. However, when the sodium compounds are used, rather than the potassium compounds, the freeze-thaw stability of the final material is not as good.

The ratio of Portland cement to the binder, in accordance with the present invention should be between 40:60 and 70:30, on a weight basis. Preferaby, the mixtures with Portland cement include from about 55 to 65% Portland cement and from about 45 to 35% of the binder. In addition, substantial amounts of fly ash can be included with the Portland cement component, the amount of fly ash generally comprising about 20% of the overall composition, the ratio of Portland cement and binder being essentially the same as just set forth.

In addition, other materials normally added to cement compositions, such as various admixtures, can be employed in the overall compositions. These admixtures or retarders include, without limitation, such materials as borax, citric acid, sugar, and various proprietary retarders, some of which will be identified in the specific formulations, below.

The following are given as examples of the formulations of the binder and binder-Portland cement compositions of the present invention. They should be considered only as illustrative and not as limiting, in any way, the full scope of the invention as covered in the appended claims. All parts, unless otherwise indicated, are by weight. While specific amounts of water are given for the overall cement formulations, water is added, essentially, to give workable mixes.

EXAMPLE 1

A binder composition was formed employing the following materials:
70 parts metakaolin
38.5 parts slag
63 parts of a mixture of fly ash, calcined shale, and calcined clay
107.8 parts silica fume
46.2 parts potassium silicate
23.4 parts potassium hydroxide

EXAMPLE 2

The binder composition of Example 1 was combined with 353.8 parts Portland cement, 1,625 parts sand, 4.9 parts borax, 9.9 parts of a material sold by ICI Americas, Inc. as Mighty 150-R (a sulfonated naphthalene formaldehyde condensate and a gluconate), along with 246 parts water. The overall composition was thoroughly blended and then cured at 150° F. After 4 hours, the resulting mortar had a compressive strength of 4,030 psi, and after 24 hours a strength of 5,380 psi.

EXAMPLE 3

Employing the same materials and conditions as in Example 2, except that no potassium hydroxide was used and the amount of silica fume was 131.2 parts, necessitating use of 321 parts of water, a compressive strength of 3,520 psi was obtained at 4 hours and 4,130 at 24 hours.

EXAMPLE 4

Employing the same materials and conditions as in Example 2, except that both the potassium hydroxide and borax were eliminated, and 254 parts of water were used, a compressive strength of 1,870 psi was obtained in 4 hours and 3,600 psi in 24 hours.

EXAMPLE 5

Employing the same materials and conditions as in Example 4, except that the amount of Mighty 150-R was reduced to 5.0 parts, and 236 parts of water were used, a compressive strength of 4,170 psi was obtained in 4 hours and 5,930 psi in 24 hours.

EXAMPLE 6

The binder of Example 1 was used in conjunction with 353.8 parts Portland cement, 1,625 parts sand, 5.0 parts Vinsol resin, and 172 parts water. Vinsol resin is manufactured by Hercules, Inc. and is a thermoplastic resin derived from southern pine wood. As employed in the present compositions, the resin is completely neutralized with sodium hydroxide. After curing for 4 hours at 150° F., a compressive strength of 5,250 psi was obtained, while a strength of 5,530 psi was obtained after 24 hours.

EXAMPLE 7

Employing the same conditions and formulations as in Example 6, except that all of the calcined shale and calcined clay were replaced by fly ash, a strength of 2,560 psi was attained in 4 hours, with essentially no change after 24 hours.

EXAMPLE 8

Employing the same materials and conditions as in Example 6, but adding 4.9 parts borax and 2.5 part citric acid, along with 190 parts water, a strength of 3,720 psi was attained in 4 hours and 7,300 psi in 24 hours.

EXAMPLE 9

Employing the same materials and conditions as in Example 8, except that 77 parts silica fume and 77 parts potassium silicate were employed, and the amount of citric acid was increased to 4.9 parts, using 150 parts water, a strength of 5,430 psi was obtained in 4 hours and 9,800 psi in 3 days.

EXAMPLE 10

Employing the same conditions and formulation as in Example 9, except that all of the calcined shale and clay were replaced by fly ash, and 130 parts of water were employed, a strength of 5,880 psi was obtained in 4 hours and 8,130 psi in 3 days.

EXAMPLE 11

A binder composition was prepared employing the following components:
70 parts metakaolin
19.2 parts slag
82.3 parts fly ash
107.8 parts silica fume
46.2 parts potassium silicate
23.4 parts potassium hydroxide.

EXAMPLE 12

The binder of Example 11 was combined with 353.8 parts Portland cement, 1,625 parts sand, 4.9 parts citric acid, and 4.9 parts Daracem-100 (a material sold by W. R. Grace & Co. and comprising a sulfonated naphthalene formaldehyde condensate, a gluconate, and a lignosulfonate), along with 150 parts water. The materials were thoroughly blended and cured at 150° F. After 4 hours, a strength of 5,180 psi was attained, and after 24 hours, 7,430 psi.

EXAMPLE 13

Employing the same materials and conditions as in Example 10, except that 65.6 parts silica fume and 65.6 parts potassium hydroxide were used, a strength of 6,580 psi in 4 hours was attained, and a strength of 9,230 psi in 3 days.

EXAMPLE 14

Employing the same materials and conditions as in Example 10, except replacing the citric acid and Daracem-100 with 1.25 parts sugar, a strength of 6,920 psi was attained in 4 hours and 9,150 psi in 3 days.

EXAMPLE 15

A binder composition was prepared with the following components:
52.5 parts kaolin
28.9 parts slag
47.2 parts of a mixture of fly ash, calcined shale, and calcined clay
57.7 parts silica fume
57.7 parts potassium silicate
7.6 parts potassium hydroxide.

EXAMPLE 16

The binder binder composition of Example 15 was combined with 437.5 parts cement, 175 parts fly ash, 1.8 parts citric acid and 4.3 parts Daratard 40 (a material sold by W. R. Grace & Co. composed of a calcium lignosulfonate) and 180 parts water. After curing at 150° F. for 4 hours, the strength was 5,780 psi, and, after 1 day, 7,110 psi.

EXAMPLE 17

Employing the same materials and procedures as in Example 16, but increasing the citric acid to 3.5 parts, and replacing the Daratard 40 with 8.3 parts Mighty 150-R, using 160 parts water, the material had a rapid loss of plasticity due to the use of an excessive amount of admixture and/or not enough water. It showed a strength of 2,630 psi after 4 hours.

EXAMPLE 18

Employing the same materials and procedures as in Example 16, but doubling the amounts of citric acid and Daratard 40, using 150 parts water, a strength after 4 hours of 3,750 psi was attained. This material had a rapid loss of plasticity due to the use of an excessive amount of admixture and/or not enough water.

EXAMPLE 19

Employing the same materials and conditions as in Example 18, but employing 80.8 parts silica fume and 34.6 parts potassium silicate, a good workability mixture was obtained which gave a strength of 4,680 psi at 4 hours and 7,100 psi at 24 hours.

EXAMPLE 20

Employing the same materials and procedures as in Example 19, but replacing 1.8 parts of the Daratard 40 with 1.8 parts borax, a strength of 6,330 psi was attained in 4 hours and 9,050 psi in 24 hours.

EXAMPLE 21

Employing the same materials and procedures as in Example 20, but replacing the borax and Daratard 40 with 3.6 parts oleic acid and halving the amount of citric acid, a strength of 6,550 psi was attained in 4 hours.

EXAMPLE 22

Employing the same materials and conditions as in Example 18, but employing one-third the amount of citric acid, two-thirds the amount of Daratard 40, and 180 parts water, a strength of 4,070 psi was attained in 4 hours and 7,170 psi in 24 hours.

EXAMPLE 23

A binder composition was prepared containing:
70 parts metakaolin
38.5 parts slag
63 parts fly ash
107.8 parts silica fume
46.2 parts potassium silicate
23.4 parts potassium hydroxide.

EXAMPLE 24

The binder composition of claim 23 was combined with 294.8 parts cement, 59 parts fly ash, 1,625 parts sand, 4.1 parts Vinsol resin, and 8.2 parts citric acid. The composition was mixed with 140 parts water and cured at 150° F. A strength of 1,360 psi was attained after 4 hours and 2,650 psi after 24 hours.

EXAMPLE 25

The same materials and conditions were employed as in Example 24, except that both the Vinsol resin and citric acid were employed in an amount of 5.3 parts and 130 parts water were used. A strength of 5,200 psi was attacined in 4 hours and 7,370 psi in 24 hours.

EXAMPLE 26

The same materials and conditions were employed as in Example 24, except that the amounts of citric acid and Vinsol resin were reversed, and 170 parts water were used. A strength of 6,380 psi was attained in 4 hours and 8,270 psi in 24 hours.

EXAMPLE 27

Concrete was prepared employing the binder of Example 23 and Portland cement, fly ash and other necessary materials as indicated below:
251 parts binder of Example 23
352 parts Portland cement
141 parts fly ash
1094 parts sand
2032 parts gravel
4.3 parts borax
4.3 parts citric acid
6.4 parts Daracem-100
125 parts water.

The various dry materials were dry blended and the liquid components were then added until a complete mixture was obtained. The concrete was placed into the molds and steam cured for 1 hour to 1½ hours and then stored in air at ambient (73° F.) temperatures. The following compressive strengths were obtained.

| 1 hour  = 5000 psi. | 3 days  = 6800 psi. |
|---|---|
| 2 hours = 5700 psi. | 7 days  = 6900 psi. |
| 4 hours = 5900 psi. | 28 days = 7100 psi. |
| 1 day   = 6500 psi. | 3 months = 8800 psi. |

When the concrete was cured at ambient (73° F.) temperatures, without the initial steam curing, the following compressive strengths were obtained:

| 4 hours = 680 psi.  | 7 days  = 8000 psi. |
|---|---|
| 1 day   = 2500 psi. | 28 days = 10,000 psi. |
| 3 days  = 5400 psi. | 3 months = 11,000 psi. |

EXAMPLE 28

Concrete was prepared employing the binder of Example 23 and Portland cement and other necessary materials as indicated below:
333 parts binder of Example 23
423 parts Portland cement
1100 parts sand
2044 parts gravel
5.7 parts borax
5.7 parts citric acid
8.4 parts Daracem-100
104 parts water.

The various dry materials were dry blended and the liquid components were then added until a complete mixture was obtained. The concrete was placed into the molds and steam cured for 1 hour to 1½ hours and then stored in air at ambient (73° F.) temperatures. The following compressive strengths were obtained:

| 1 hour  = 5100 psi. | 3 days  = 6800 psi. |
|---|---|
| 2 hours = 6000 psi. | 7 days  = 7300 psi. |
| 4 hours = 6400 psi. | 28 days = 7700 psi. |
| 1 day   = 6700 psi. | 3 months = 8200 psi. |

When the concrete was cured at ambient (73° F.) temperatures, without the initial steam curing, the following strengths were obtained:

| 4 hours = 1000 psi. | 7 days  = 9500 psi. |
|---|---|
| 1 day   = 4000 psi. | 28 days = 11,500 psi. |
| 3 days  = 5800 psi. | 3 months = 13,500 psi. |

In accordance with the present invention, a new binder composition for Portland cement and a new composition including Portland cement, the Portland cement composition providing high early strength and high ultimate strength at ambient conditions, have been shown and described. The invention should not be considered as limited by the specific examples, but only as set forth in the appended claims.

What is claimed as new is:

1. A binder composition for Portland cement comprising 100 parts, by weight, metakaolin and, based upon said metakaolin:
20 to 70 parts by weight slag
85 to 130 parts by weight of at least one material selected from the class consisting of fly ash, calcined shale, and calcined clay
70 to 215 parts amorphous silica
55 to 145 parts of a material selected from the class consisting of potassium silicate and potassium hydroxide, at least 55 parts being potassium silicate.

2. The binder of claim 1 wherein the amorphous silica is silica fume.

3. The binder composition of claim 1 wherein the amount of amorphous silica is from 85 to 160 parts, by weight.

4. The binder composition of claim 3 wherein the amount is from 85 to 115 parts, by weight.

5. The binder composition of claim 1 wherein said slag is contained in an amount of from 30 to 50 parts by weight.

6. The binder composition of claim 1 wherein the material selected from the class consisting of fly ash, calcined shale, and calcined clay is fly ash.

7. The binder composition of claim 1 wherein the amount of potassium silicate and potassium hydroxide is from 65 to 115 parts by weight.

8. A cement composition comprising, on a weight basis, from 40 to 70 parts Portland cement and from 60 to 30 parts of the binder composition of claim 1.

9. The cement composition of claim 8 wherein said Portland cement is contained in an amount of from 55 to 65 parts by weight and said binder composition in an amount of from 45 to 35 parts by weight.

10. The cement composition of claim 9 having, in addition, 20 parts, by weight, fly ash.

11. A binder composition for Portland cement comprising 100 parts, by weight, metakaolin and, based upon said metakaolin:
20 to 70 parts by weight slag
85 to 130 parts by weight of at least one material selected from the class consisting of fly ash, calcined shale, and calcined clay
70 to 215 parts amorphous silica
55 to 145 parts of a material selected from the class consisting of potassium silicate and sodium hydroxide, at least 55 parts being potassium silicate.

12. A binder composition for Portland cement comprising 100 parts, by weight, metakaolin and, based upon said metakaolin:
20 to 70 parts by weight slag
85 to 130 parts by weight of at least one material selected from the class consisting of fly ash, calcined shale, and calcined clay
70 to 215 parts amorphous silica
55 to 145 parts of a material selected from the class consisting of sodium silicate and sodium hydroxide, at least 55 parts being sodium silicate.

* * * * *